United States Patent [19]

Davis et al.

[11] 4,416,773

[45] Nov. 22, 1983

[54] VALVE MECHANISM FOR MULTIPLE DISTRIBUTOR FLUID TREATMENT SYSTEM

[75] Inventors: Stephen H. Davis, Middletown; Daniel W. Simpson, Fairfield, both of Ohio

[73] Assignee: Water Refining Company, Inc., Middletown, Ohio

[21] Appl. No.: 350,710

[22] Filed: Feb. 22, 1982

[51] Int. Cl.³ .............................................. B01D 23/20
[52] U.S. Cl. .................................................. 210/289
[58] Field of Search ............... 210/136, 279, 289, 291

[56] References Cited

U.S. PATENT DOCUMENTS

| | | | |
|---|---|---|---|
| 2,761,469 | 9/1956 | Hansen | 137/614 |
| 2,813,545 | 11/1957 | Garnik | 137/599.2 |
| 2,973,097 | 2/1961 | Snider | 210/289 |
| 3,306,504 | 2/1967 | Tischler | 210/136 |
| 3,625,365 | 12/1971 | Armstrong et al. | 210/279 |
| 4,193,868 | 3/1980 | Meyers | 210/289 |
| 4,220,531 | 9/1980 | Robison | 210/289 |

Primary Examiner—Ivars C. Cintins

Attorney, Agent, or Firm—Biebel, French & Nauman

[57] ABSTRACT

A valve mechanism is used in combination with a fluid treatment device of the type having a tank defining a treatment bed, particulate treatment material contained within the treatment bed, and a central distribution tube mounted in the bed and terminating in a plurality of distributors which provide fluid communication between the bed and the distribution tube. The valve mechanism consists of a plurality of ball valves, each connected to a different one of the distributors and having unidirectional flow restriction assemblies such that fluid flow in a first direction from the bed to the distributor tube is relatively unrestricted, and fluid flow in a second direction from the distribution tube to the treatment bed is relatively restricted. By providing a substantial flow restriction resistance in each of the distributors conduits, fluid flow through the distributors during a backwashing cycle remains relatively balanced regardless of the variation in resistance due to dirt concentration around each distributor so that the treatment material surrounding each distributor is sufficiently agitated.

7 Claims, 6 Drawing Figures

VALVE MECHANISM FOR MULTIPLE DISTRIBUTOR FLUID TREATMENT SYSTEM

BACKGROUND OF THE INVENTION

1. Field of the Invention

The present invention relates to fluid treatment systems, and more particularly, to water treatment systems utilizing a bed of particulate treatment material and having apparatus for regenerating the treatment material.

2. Prior Art

Many large, commercial water treatment systems of the ion exchange type presently in use are constructed to receive untreated water through an inlet line in the top of a pressure tank so that it percolates downwardly through a bed of treatment material, such as zeolite, and passes out of the pressure tank through an outlet line originating in a lower portion of the tank. The outlet line preferably consists of a central distribution tube, mounted within the pressure tank, and a plurality of distributor conduits extending outwardly from a lower end of the central distribution tube and terminating in distributors. The distributors are generally hollow and cylindrical in shape, and have perforations in their walls to permit the entry of water from the pressure tank while preventing the entry of the treatment material. As the untreated water percolates through the bed of treatment material, an ion exchange takes place in which ions held by the treatment material are exchanged for ions in the untreated water. It is important that the flow resistance provided by the overall system during normal operation be kept to a minimum so that the pressure of the treated water does not drop below a minimum pressure level.

The water treating ability of the treatment bed is gradually reduced by continued use and, after a predetermined quantity of water has been treated, the treatment material in the bed becomes depleted and is no longer able to effect an ion exchange. The treatment bed is thereafter regenerated by passing a fluid solution through it so that the ion exchange process is reversed: the ions held by the spent treatment material which had been received from the water are exchanged for ions suspended in the regenerating fluid solution.

Prior to the regeneration cycle of a typical water softening system, the system undergoes a backwashing cycle in which water, which may be hard, soft, or decationized, enters the pressure tank through the central distribution tube and exits the distributors to percolate upward and leave the pressure tank through the inlet line. This flow of water from the distributors upwardly causes the treatment material to be agitated, which loosens the packed treatment material and forces deposits of debris previously carried into the pressure tank from the inlet line to migrate upwardly through the treatment bed and out the inlet line. The loosened material can be regenerated more thoroughly.

To provide a thorough removal of accumulated debris from the treatment bed during this backwashing cycle, it is important that the entire resin bed be agitated. However, if the distributors are placed at different levels within the pressure tank, or where debris has accumulated to a greater degree around one or more of the distributors than around the remaining distributors, the resistance to fluid flow from the central distribution tube through the distributors becomes unequal. As a result, fluid flow through the distributors from the central distribution tube is unequal, as the water follows the path of least resistance. Since fluid flow through those distributors having the greatest resistance is the least, the treatment material surrounrding those distributors is agitated less than the treatment material around the other distributors having relatively little resistance. Consequently, accumulated debris is not removed as thoroughly from the treatment material having heavier soil concentrations as it is from treatment material having lighter concentrations of soil.

Accordingly, there is a need for a water treatment system which compensates for the variance in resistance to fluid flow through the distributors during a backwash cycle so that the fluid flow through each distributor is not reduced substantially as a result of debris concentration, whereby all portions of the treatment bed may be agitated sufficiently.

SUMMARY OF THE INVENTION

The present invention provides an improved water treatment system of the type having a plurality of distribution conduits extending from a central distribution tube and terminating in distributors. The improvement consists of the addition of a valve mechanism which permits balanced flow of fluid from the central distribution tube through the distributors and into the treatment bed of the pressure tank, thereby compensating for variations in resistance surrounding each distributor and caused by soil debris conditions and/or the variation in elevation within the pressure tank of the distributor, during the backwashing cycle. Although the invention will be described in reference to a water softening system, the invention will function effectively in any gaseous or liquid fluid treatment system having a bed of treatment material and a multiple distributor apparatus for agitating the treatment material during a backwashing cycle.

The valve mechanism of the invention preferably consists of a plurality of ball valves, each mounted on a different one of the distribution conduits and having a unidirectional flow restriction component orieted such that fluid flow in a first direction from the bed through the distribution conduit to the central distribution tube is relatively unrestricted, and fluid flow in a second direction from the central distribution tube to the treatment bed is relatively restricted. The ball valve preferably consists of a hollow body which defines a chamber having an inlet communicating with the central distribution tube and an outlet communicating with the distributor and treatment bed, a ball positioned within the chamber, a first ball seat member associated with the inlet for seating the ball during fluid flow in the first direction, and a second ball seat member associated with the outlet for seating the ball during fluid flow in the second direction. The first ball seat member defines a first opening position to permit a relatively unrestricted flow of fluid through the inlet when the ball is seated in the first ball seat member during fluid flow in the first direction. The second ball seat member defines a second opening, smaller than the first opening, positioned to provide a relatively restricted flow of fluid through the outlet when the ball is seated in the second ball seat member and the fluid is flowing in the second direction.

The effect of the ball valves is to introduce a restriction or resistance into each distribution conduit that is relatively large in magnitude compared to the variations in resistance anticipated to occur in the treatment bed due to soil debris conditions and/or the relative elevations of the distributors within the pressure tank. By providing a relatively large resistance in each of the distribution conduits, the total resistance for each distribution conduit—which comprises the resistance provided by the ball valve added to the increased resistance resulting from conditions existing about the associated distributor—will be substantially the same. Therefore, during the backwashing cycle when fluid flows from the central distribution tube through the distributors to the treatment bed, fluid flow will be substantially the same through each distribution conduit. Agitation of the treatment bed in order to dislodge collected debris will be substantially the same for the areas surrounding each distributor, so that the treatment bed is uniformly agitated and thereby thoroughly cleansed.

Accordingly, it is an object of the present invention to provide an improved valve mechanism for a multiple distributor water treatment system which eliminates extreme variations in fluid flow from one distributor to another during backwashing which would otherwise be caused by variations in debris concentration in the treatment material surrounding the distributors and/or the variations in elevation of the distributors within the treatment bed; and to provide such a valve mechanism which does not significantly affect fluid flow during normal operation of the water treatment system.

Other objects and advantages of the invention will be apparent from the following description, the accompanying drawings and the appended claims.

BRIEF DESCRIPTON OF THE DRAWINGS

DESCRIPTION OF THE PREFERRED EMBODIMENT

Figure 1:
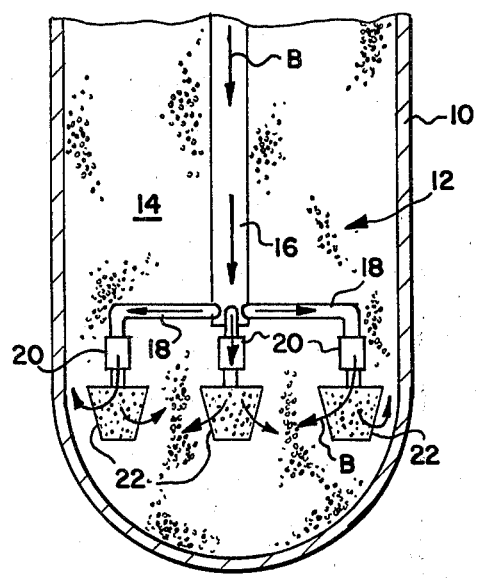
FIG. 1 is a fragmentary side elevation in section of a pressure tank showing the multiple distributor system of the preferred embodiment of the invention.

The multiple distributor water treatment system of the present invention is shown in FIG. 1. A pressure tank 10 defines a treatment bed 12 containing a quantity of particulate treatment materal 14, preferably a granulated resin such as zeolite. The pressure tank 10 is sealed from the atmosphere at its top (not shown) in a manner well-known in the art and disclosed, for example, in U.S. Pat. No. 4,289,617, issued to the assignee of the present invention.

Mounted within the pressure tank 10 is a central distribution tube 16 which extends downwardly from the top of the tank into the treatment bed 12. Central distribution tube 16 communicates with a valve mechanism (not shown) which is capable of placing the tube in fluid communication with either a supply line, which in turn communicates with a source of water under pressure so that the water flows downwardly through the tube, or with an outlet line (not shown) which conveys water which has passed through the treatment bed 12 and distribution tube to terminal points where the treated water is used.

The central distribution tube 16 terminates in a plurality of distribution conduits 18. The distribution conduits each include a valve 20 and a distributor 22 (shown in FIG. 2). The distributors 22 are generally frusto-conical in shape and have a wall 24 defining a plurality of openings 26 which permit fluid communication between the distribution conduit 18 and treatment bed 12.

The valves 20 each have a generally cylindrical valve body 28 defining a valve chamber 30 including an inlet 32 and an outlet 34. The inlet 32 of each valve 20 communicates with its associated distribution conduit 18, and the outlet 34 communicates with its associated distributor 22. A ball 36 is positioned within the valve chamber 30 and is sized so that it may be displaced either toward the inlet 32 or toward the outlet 34. The ball 36 is preferably constructed so as to have a specific gravity of one or greater.

Figure 2:
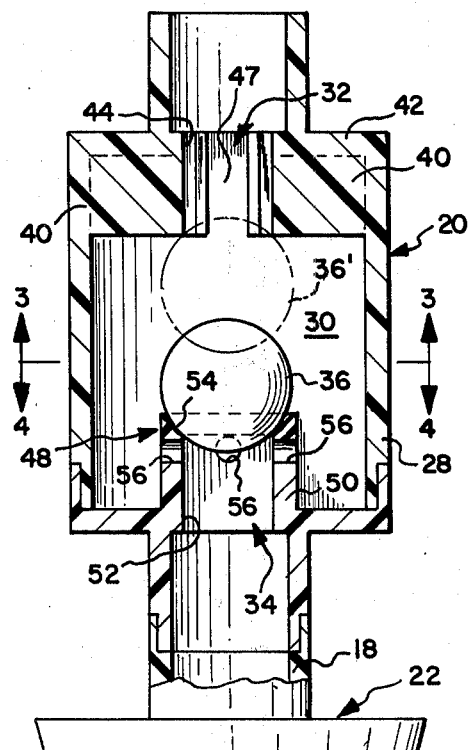
FIG. 2 is a detail of one of the valves of FIG. 1, showing the valve body in section and the ball seated on the outlet ball seat.
Figure 3:
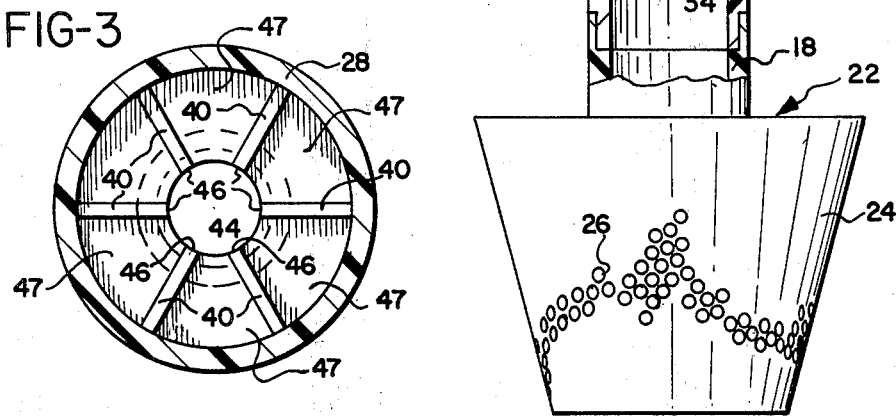
FIG. 3 is a section of the ball valve of FIG. 2 taken at line 3—3.

As shown in FIGS. 2 and 3, the inlet 32 includes a first ball seat 38 which is defined by a plurality of rectangular plates 40 extending downwardly from the top portion 42 of the valve body 28 adjacent the inlet and disposed radially about the periphery of the inlet opening 44. The ball 36 is sized such that it may be seated against the ball seat 38 so that the surface of the ball is supported by the radially inner edges 46 of the plates 40, as shown by the phantom ball 36' in FIG. 2. Adjacent plates 40 also define openings 47 which extend from the valve chamber 30 to the inlet opening 44. Preferably, the combined area of openings 47 is at least equal to the cross sectional area of inlet opening 44 so that fluid flow is unrestricted by the presence of the ball 36 on the ball seat 38.

Figure 4:
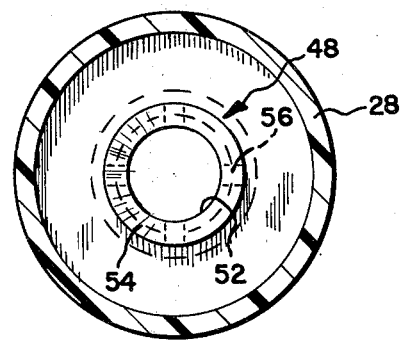
FIG. 4 is a section of the ball valve of FIG. 2 taken at line 4—4.

The outlet 34 includes a second ball seat 48, shown in FIGS. 2 and 4. The second ball seat 48 is formed in a cylindrical boss 50 which surrounds the outlet opening 52. Boss 50 includes an open, beveled upper end 54 which is sized to receive the ball 36 so that the ball becomes somewhat wedged into the upper end during downward fluid flow, as shown in FIG. 2. The boss 50 includes restrictive side ports 56 formed in its side which permit fluid communication between the interior 58 of the boss 50 and the valve chamber 30 when the ball 36 is seated on the upper end 54 of the boss.

Figure 5:
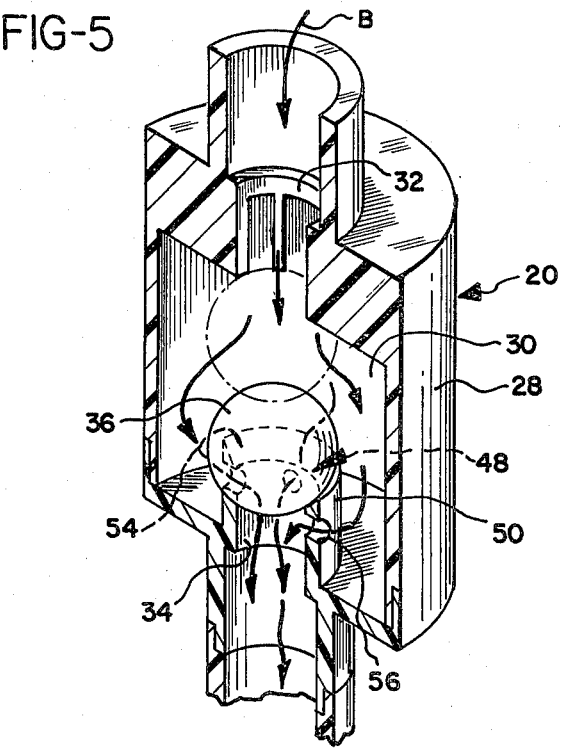
FIG. 5 is a perspective view of the ball valve of FIG. 2 and having arrows showing fluid flow during a backwashing cycle.
Figure 6:
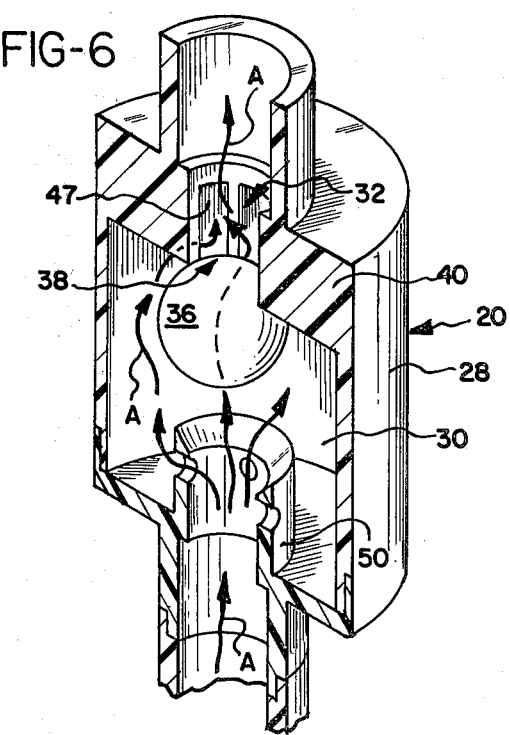
FIG. 6 is a perspective view of the ball valve of FIG. 2, modified to show the ball seated against the inlet ball seat and having arrows showing fluid flow during a water treatment cycle.

The operation of the valve mechanism is shown most clearly in FIGS. 1, 5, and 6. During the treatment phase of operation of the water treatment system, water enters the top of the pressure tank 10 and migrates downwardly through the treatment material 14 to the distributors 22. As the water filters downwardly, an ion exchange occurs between the ions in the water (i.e. cations or anions) and the sodium ions in the treatment material. For example, in a common water softening process, the metallic ions in the water are replaced by sodium or hydrogen ions. By the time the water has reached the location of the distributors 22 it has become substantially depleted of ions and the treated water then passes through the distributors, the distribution conduits 18, and the central distribution tube 16 to be conveyed to a location remote from the pressure tank for use. During this phase of operation, the valves 20 operate as shown in FIG. 6. The fluid path, shown by the arrows A, is in a generally upward direction from the distributor 22, through the boss 50, and into the valve chamber 30. The force of the fluid causes the ball 36 to travel upward toward the inlet 32 of the valve body, where it becomes seated on the first ball seat 38. In this mode, the fluid passes from the valve chamber 30 freely through the openings 47 and into the distribution conduits 18 (FIG. 1). The space defining the openings 47 is sufficiently large to allow fluid flow from the valve chamber 30 to the distribution conduit 18 in each valve 20 without forming a restriction which would reduce the rate of fluid flow through the valve.

When the water treatment system is cycled and is placed in the backwashing mode, water flow through the pressure tank 10 is reversed so that water flows in the direction of arrows B in FIGS. 1 and 5. Thus, water enters the pressure tank 10 through the central distribution tube 16 and travels through the distribution conduits 18, distributors 20, and into the treatment bed 12 where it travels upwardly and, in doing so, agitates the treatment material 14. As shown in FIG. 5, the downwardly flowing water enters the valve 20 through the inlet 32, thereby forcing the ball 36 downwardly upon the upper end 54 of the second ball seat 48. The diameter of the valve body 28 is such that the ball 36 cannot fall between the conduit 50 and the interior wall of the valve body. Rather, it encounters the beveled upper end 54 of the conduit 50 and falls by gravity and by the force of the flowing fluid to close the second ball seat 48. Thus, in the backwashing mode of operation, the fluid entering the valve chamber 30 through the inlet 32 must pass through the restrictive side ports 56 in the boss in order to exit the outlet 34 of the valve.

Thus, during the backwashing mode of operation, the valves 20 create substantial restrictions in the distribution conduits 18 resulting in a very large resistance occuring in each of the distribution conduits. Preferably, the magnitude of the resistances created by the valves 20 is much greater than any anticipated resistance created by deposits of soil debris surrounding one or more of the distributors 22, or resulting from differences in elevation within the pressure tank 10. As a result, the combined resistance for each distribution conduit 18, comprising the resistance of the valve 20 added to any resistance caused by the condition of the treatment material surrounding the distributor, are substantially the same for each distributor. Thus, fluid flow through the distribution conduits 18 is uniform and the treatment material 14 surrounding each distributor 22 is agitated sufficiently to dislodge collected soil debris therein.

It should be noted that, while the preferred embodiment comprises a ball valve, any valve which provides unidirectional flow restriction characteristics such that fluid flow in a first direction is relatively unrestricted, and fluid flow in a second direction opposite the first direction is relatively restricted, can be used without departing from the scope of the invention. Therefore, it is to be understood that the invention is not limited to this precise form of apparatus, and that changes may be made therein without departing from the scope of the invention.

What is claimed is:

1. In a fluid treatment device of the type having a tank defining a treatment bed, particulate treatment material contained within said treatment bed, and a central distribution tube mounted in said bed and terminating in a plurality of distribution means, said distribution means providing fluid communication between said bed and said tube, the improvement wherein each of said distribution means comprises:

valve means having unidirectional flow restriction means such that fluid flow in a first direction from said bed through each of said distribution means to said central distribution tube is relatively unrestricted by said flow restriction means, and fluid flow in a second direction from said central distribution tube through each of said distribution means to said bed is reduced but not eliminated by said fluid restricton means.

2. The treatment device of claim 1 wherein each of said valve means comprises a ball valve.

3. The treatment device of claim 2 wherein each of said ball valves comprises:

a hollow body defining a chamber and having an inlet communicating with said central distribution tube and an outlet communicating with said bed;

a ball positioned within said chamber such that fluid flow in said first direction causes said ball to be displaced toward said inlet, and fluid flow in said second direction causes said ball to be displaced toward said outlet;

a first ball seat member associated with said inlet for seating said ball during fluid flow in said first direction and defining a first opening positioned to permit a relatively unrestricted flow of fluid through said inlet when said ball is seated in said first ball seat member; and a second ball seat member associated with said outlet for seating said ball during fluid flow in said second direction and defining a second opening, smaller than said first opening, positioned to provide a relatively restricted flow of fluid through said outlet when said ball is seated in said second ball seat member.

4. The treatment device of claim 3 wherein said first ball seat member comprises a plurality of plate members radially disposed about said inlet, each plate member having a radially inner edge for receiving said ball such that said plate members define spaces therebetween comprising said first opening.

5. The treatment device of claim 3 or 4 wherein said second ball seat member comprises a tubular boss surrounding said outlet and extending into said chamber, said boss having an upper opening for receiving said ball and having at least one port comprising said second opening.

6. The treatment device of claim 5 wherein said inlet, first ball seat member, second ball seat member, and outlet are substantially aligned along a central axis of said body.

7. The treatment device of claim 3 or 4 wherein said inlet, first ball seat member, second ball seat member, and outlet are substantially aligned along a central axis of said body.

* * * * *